(12) United States Patent
Welsh et al.

(10) Patent No.: US 6,819,824 B1
(45) Date of Patent: Nov. 16, 2004

(54) OPTICAL SWITCH PACKAGE

(75) Inventors: David Welsh, Goleta, CA (US); James R. Sechrist, Goleta, CA (US); John Edward Bowers, Santa Barbara, CA (US); Adrian Keating, Santa Barbara, CA (US); Xuezhe Zheng, Goleta, CA (US); David Kinghorn, Sunnyvale, CA (US); Bart Erwin, Goleta, CA (US); Roger Jonathan Helkey, Montecito, CA (US); Paul Wills, Santa Barbara, CA (US)

(73) Assignee: Calient Networks, San Jose, CA (US)

( * ) Notice: Subject to any disclaimer, the term of this patent is extended or adjusted under 35 U.S.C. 154(b) by 216 days.

(21) Appl. No.: 09/862,220

(22) Filed: May 21, 2001

(51) Int. Cl.[7] .................................................. G02B 6/26
(52) U.S. Cl. ............................. 385/18; 385/15; 359/320
(58) Field of Search .............................. 385/15, 16, 17, 385/18; 559/198; 359/214, 224, 320, 321, 290, 291, 295, 298

(56) References Cited

U.S. PATENT DOCUMENTS

| | | | | |
|---|---|---|---|---|
| 5,436,997 A | * | 7/1995 | Makiuchi et al. | 385/92 |
| 6,097,859 A | * | 8/2000 | Solgaard et al. | 385/17 |
| 6,289,145 B1 | * | 9/2001 | Solgaard et al. | 385/18 |
| 6,292,281 B1 | * | 9/2001 | Bala et al. | 385/18 |
| 6,295,154 B1 | * | 9/2001 | Laor et al. | 385/18 |
| 6,327,398 B1 | * | 12/2001 | Solgaard et al. | 385/18 |
| 6,335,224 B1 | * | 1/2002 | Peterson et al. | 438/114 |
| 6,348,991 B1 | * | 2/2002 | Smith et al. | 359/321 |
| 6,374,008 B2 | * | 4/2002 | Solgaard et al. | 385/17 |
| 6,379,988 B1 | * | 4/2002 | Peterson et al. | 438/51 |
| 6,389,190 B2 | * | 5/2002 | Solgaard et al. | 385/18 |
| 6,411,751 B1 | * | 6/2002 | Giles et al. | 385/18 |
| 6,428,173 B1 | * | 8/2002 | Dhuler et al. | 359/224 |
| 6,429,417 B1 | * | 8/2002 | Street et al. | 250/214.1 |
| 6,442,307 B1 | * | 8/2002 | Carr et al. | 385/18 |
| 6,445,844 B1 | * | 9/2002 | Neukermans et al. | 385/18 |
| 6,446,711 B1 | * | 9/2002 | DeGroot et al. | 165/149 |
| 6,456,753 B1 | * | 9/2002 | Gee et al. | 385/18 |
| 6,470,110 B1 | * | 10/2002 | Lin | 385/18 |
| 6,522,802 B2 | * | 2/2003 | Hoen | 385/18 |
| 2002/0097952 A1 | * | 7/2002 | Jin et al. | 385/18 |
| 2002/0122619 A1 | * | 9/2002 | Sandler et al. | 385/17 |
| 2002/0154851 A1 | * | 10/2002 | Yeh et al. | 385/16 |

* cited by examiner

Primary Examiner—Michael P. Stafira
Assistant Examiner—Juan D Valentin, II
(74) Attorney, Agent, or Firm—Beyer Weaver & Thomas, LLP

(57) ABSTRACT

Optical switch packaging techniques and optical switch components are described. In one aspect, an optical switch component that includes a die mounted on an interposer is described. The die has an exposed array of mirrors that can be used as part of an optical switch. Typically, the interposer will also have a fiber array mount arranged to receive a fiber bundle and to position the fiber bundle appropriately over the array of mirrors. In some embodiments, an optical switch can be formed by putting together two mirror image interposer based optical switch components. When placing two interposer based optical switch components together, an alignment frame may be positioned between the interposers to help maintain a desired spacing between the respective arrays of mirrors.

In some such embodiments, an inner housing is provided that encloses the dice, the fiber array mounts the alignment frame and portions of the interposers, but leaves connectors mounted on the interposers exposed. An outer housing may optionally be provided to encase the optical switch components and the inner housing. A resilient filler material may also be provided between the inner and outer housings to provide additional protection to the optical switch.

49 Claims, 10 Drawing Sheets

OPTICAL SWITCH PACKAGE

BACKGROUND OF THE INVENTION

The present inventions relate generally to packaging for optical switches.

In recent years there have been extensive efforts to develop commercially viable optical switches. Presently there are a few relatively small optical switches on the market (e.g. eight port switches). There are also on-going efforts to develop larger optical switches (e.g., switches having 64 to thousands of ports). One proposed optical switch architecture contemplates the use of arrays of Micro Electro-Mechanical Systems (MEMS) mirrors to accomplish the switching. A perceived advantage of this approach is that it is potentially scalable to many channels. One such MEMS mirror based optical switching system is diagranmatically represented in FIG. 1(a).

In the embodiment shown, the optical switch 5 includes an input fiber array 10, an input lens array 11, input and output mirror arrays 12, 13, an output lens array 14 and an output fiber array 15. The input and output fiber blocks 10, 15 each consists of a two dimensional array of fibers with a polished end face. The input fiber block 10 is positioned adjacent an input lens array 11 to provide collimated input beams, while the output lens array 14 is positioned adjacent output fiber block 15 to provide collimated output beams. Each mirror in the input and output mirror arrays is rotatable about two orthogonal axes so that an input beam received on any one of the input fibers can be directed towards any one of the output fibers by appropriately adjusting the orientation of their associated mirrors.

In theory, the mirror arrays can be formed using a wide variety of techniques and different companies have adopted different approaches in their attempts to provide suitable mirror arrays. By way of example, one approach is to create movable mirrors by forming MEMS structures on a monolithic silicon substrate. Devices such as these are commercially available from a variety of sources including MCNC of Research Triangle Park, N.C. and Analog Devices of Cambridge, Mass.

In some implementations, the mirrors are actuated electrostatically. In the configuration illustrated in FIGS. 1(a) and 1(b), each mirror is rotatable about two orthogonal axes. The mirrors have an equilibrium position, from which they rotate bidirectionally about the respective axes. Since electrostatic actuators ordinarily can move a mirror in only one direction from equilibrium, four electrodes are typically needed to actuate each mirror in each array and eight electrodes are needed per switch channel. Consequently, a very large number of electrical interconnections are needed to drive a large optical switch.

Figure 1B:
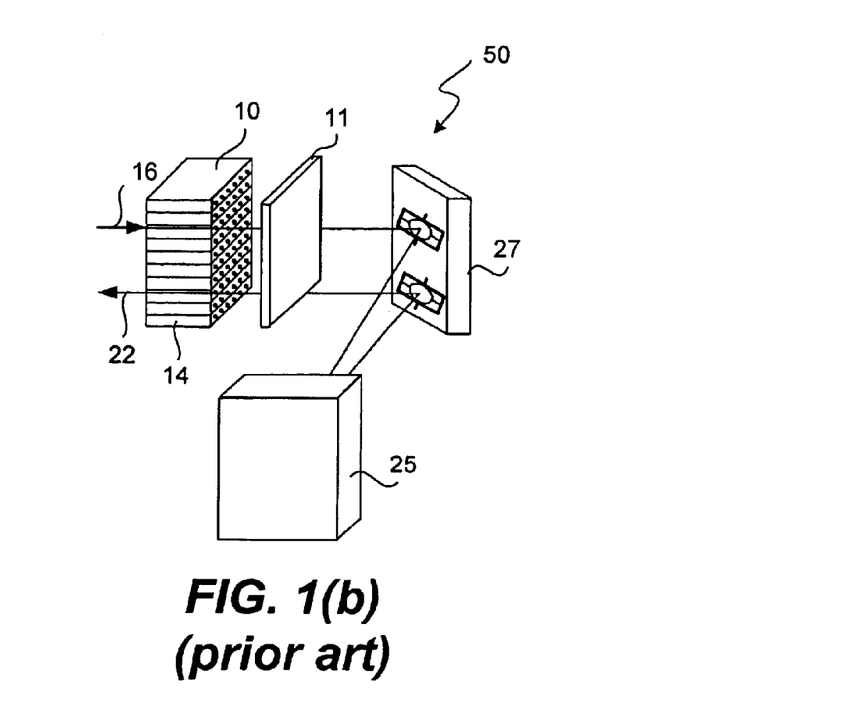
FIG. 1(b) is a diagrammatic representation of the optical paths associated with a three-dimensional optical switch having the input and output fiber arrays on the same side of the switch.

Another common optical switch configuration is illustrated in FIG. 1(b). In this configuration, a "folded" optical path is provided by using a fixed mirror 25 that cooperates with a moveable mirror array 27 (which may be implemented as a single mirror array or multiple mirror arrays) so that an input beam is reflected first off of an associated input mirror in moveable mirror array 22. The first mirror directs the beam to reflect off of the fixed mirror 25 to an output mirror associated with the desired output channel. With this arrangement, all of the moveable mirrors can be placed on the same "side" of the optical switch while the input and output fiber arrays can be placed together on the other side of the optical switch.

Regardless of which of the described (or other) approaches is used, the mirror arrays must be packaged in a manner that provides the required number of electrical interconnections. A rigid mechanical structure is also required to accurately align the optical components. In one proposed implementation, the mirror arrays are mounted on a rigid metal structure, while the electrical interconnections are provide by other means such as a flexible electrical cable. A difficulty with this approach is that the electrical cables that are large enough to provide the number of interconnections needed in a large optical switch are not very flexible. This problem is accentuated by the requirement that the traces must be relatively widely spaced due to the high voltages needed to drive current MEMS based electrostatic actuators (typically 100V or more today, although these requirements are expected to decrease as the technology develops). The silicon substrates are quite fragile and there is a danger that the stiffness of the required cables might damage the MEMS mirror arrays through mechanical stress if the interconnecting cables were attached directly to the mirror arrays. Accordingly, there is a need for improved packaging arrangements for optical switches.

SUMMARY OF THE INVENTION

To achieve the foregoing and other objects of the invention, a variety of improved optical switch packaging techniques and optical switch components are described. In one aspect of the invention, an optical switch component that includes a die mounted on an interposer is described. The die has an exposed array of mirrors that can be used as part of an optical switch. Typically, the interposer will also have a fiber array mount arranged to receive a fiber array and to position the fiber array appropriately over the array of mirrors. The interposer may also carry electrical connectors suitable for electrical connection to external devices. In this arrangement, bond pads on the die are electrically connected to the electrical connectors through appropriate conductive features on the interposer.

In some embodiments, the contact pads are positioned around an opening in the interposer and the array of mirrors is exposed through the interposer opening. In one preferred implementation, the die is attached to the interposer by directly metallurgically joining bond pads on the die to associated contact pads on the interposer. In another embodiment, the die is attached to the interposer and wire bonding is used to facilitate the electrical connection between the die and interposer.

In another aspect of the invention, the fiber array mount carried by the interposer includes a base, an alignment stage and a bracket. The base has an alignment ridge and the alignment stage has a stage slot therein that fits over the alignment ridge. The stage also includes a ledge within the slot. The bracket is sized to fit into the slot and has a bracket ledge arranged to rest on the stage ledge within the slot. The bracket also includes a bottom surface recess arranged to nest over the alignment ridge within the slot. Fasteners are provided to couple the bracket to the base to hold the alignment stage and base together.

In many of the described embodiments, an optical switch can be formed by putting together two of the described interposer based optical switch components. In some embodiments the two components may be mirror images of one another, although this is not a requirement. When placing two interposer based optical switch components together, an alignment frame may be positioned between the interposers to help maintain a desired spacing between the respective arrays of mirrors. In some such embodiments, the alignment frame may be arranged to rest directly on the interposers and to surround the dice and fiber arrays.

In other embodiments of an optical switch, an inner housing is provided that encloses the dice, the fiber array mounts the alignment frame and portions of the interposers, but leaves the connectors exposed. In one preferred implementation incorporating a housing, the inner housing is sealed and a seal is formed between the inner housing and the respective interposers by soldering the inner housing directly to the interposers. A heater or cooler may optionally be provided to heat or cool the inner housing.

In various embodiments, the fiber bundle is a collimated array of optical fibers. Ribbon cables may be coupled to the interposer connectors, with each ribbon cable having an external connector for connecting to external systems.

In another aspect of the invention, an optical switch is provided which has an outer housing in addition to the inner housing. The outer housing encases the optical switch components and the inner housing and a resilient filler material is provided between the inner and outer housings to provide additional protection to the optical switch.

BRIEF DESCRIPTION OF THE DRAWINGS

The invention, together with further objects and advantages thereof, may best be understood by reference to the following description taken in conjunction with the accompanying drawings in which:

FIG. 1(a) is a diagrammatic representation of the optical paths associated with a three-dimensional optical switch using movable mirrors that scan in two axes.

FIG. 11 (a) is a diagrammatic perspective illustration of a substrate based optical switch component having a fixed mirror in accordance with another embodiment of the present invention.

DETAILED DESCRIPTION OF THE INVENTION

Figure 2:
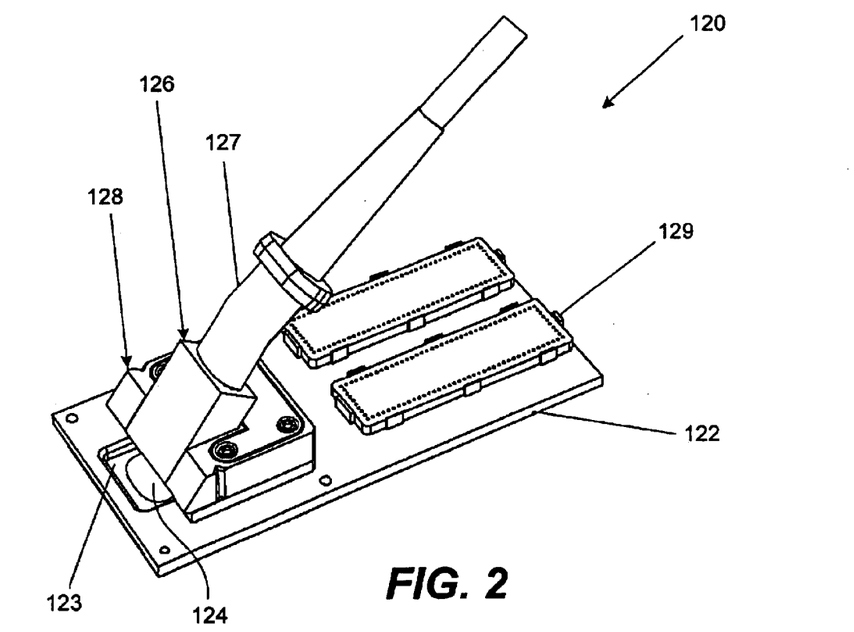
FIG. 2 is a diagrammatic perspective illustration of an interposer based optical switch component in accordance with one embodiment of the present invention.

An optical switch package in accordance with one embodiment of the invention will be initially described with reference to FIGS. 2–10. FIG. 2 is a diagrammatic illustration of an interposer based optical switch component 120 in accordance with one embodiment of the present invention. The optical switch component 120 includes an interposer 122, a die 123 having an array of mirrors 124, a fiber array mount 128 and a plurality of electrical interposer connectors 129. A fiber termination 126 is secured to the interposer 122 by the fiber array mount 128 and a bundle of optical fibers 127 exits from the fiber termination 126.

Figure 3:
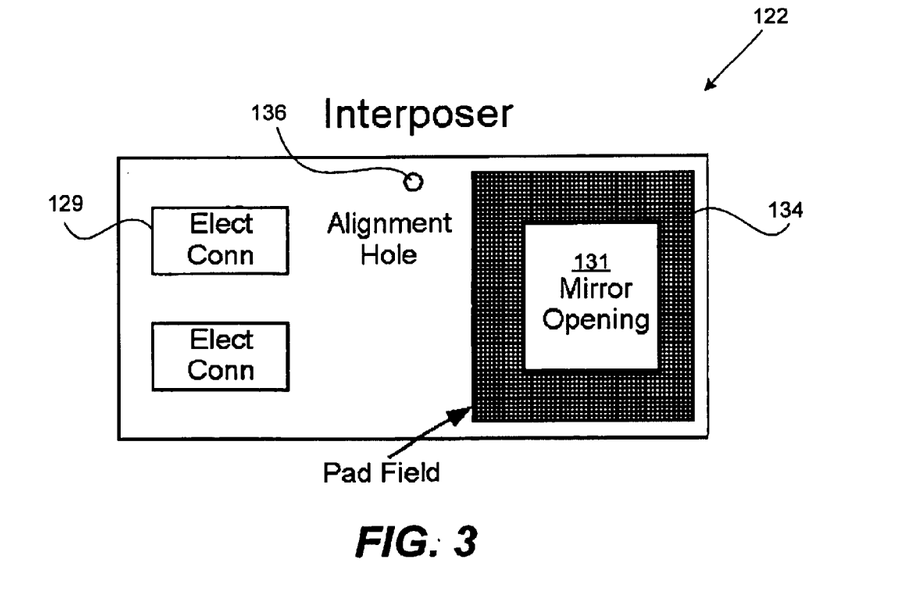
FIG. 3 is a diagrammatic top view of the interposer of FIG. 2.

The interposer 122 can take a wide variety of forms. One suitable interposer construction is illustrated in FIG. 3. In this embodiment, the interposer 122 has a mirror opening 131 that is surrounded on one side by an array of contact pads 134 that make up a contact pad field. The contact pads, in turn, are electrically coupled to the electrical connectors 129 via electrical traces (not shown). The traces may be any type of electrical conductors produced using modern microfabrication techniques. With this arrangement, the die 123 can be mounted on the interposer 122 in a mirror array down configuration to expose the mirror array through the mirror opening 131. The die 123 can be electrically connected to the contact pads 134 on the interposer 122 by any suitable method. By way of example, direct soldering in a flip chip mounting style or wire bonding may be used. In the illustrated embodiment, a flip chip mounting style is contemplated such that bond pads (not shown) on the die 123 are directly soldered to the contact pads 134 on the interposer using solder balls, posts or the like. In other embodiments, wire bonding, TAB, conductive adhesives, as well as other conventional interconnection techniques can be used to electrically couple the die 123 to the interposer 122. An alignment hole 136 may be provided to provide a reference for handling equipment during assembly of the optical switch component 120.

In the embodiments shown the die is mounted in a mirror array down configuration so that the mirror array 124 is exposed through the mirror opening 131. This configuration has several advantages, one of which is that it allows the die 123 to be mounted on the opposite side of the interposer from the fiber termination 126 which makes it easier to prevent interference between the fiber array mount 128 and the die. However, in alternative embodiments, the die 123 may be mounted on the same side of the interposer 122 as the fiber termination 126 which eliminates the need for the mirror opening 131. This arrangement has some advantages as well. For example, same side die mounting generally permits the use of smaller dice, which can have a significant impact on the production costs of the mirror arrays.

Interposers in general (as well as suitable interposer fabrication techniques) are well known in the semiconductor packaging area and any of a wide variety of interposer designs may be used. Generally an interposer is a substrate structure that provides both mechanical support and electrical interconnection. By way of example, the interposers may be formed from ceramic materials such as Alumina or Aluminum Nitride, or from a composite laminate (such as printed circuit board laminates), silicon, polymer composites, ceramic or metal matrices or a wide variety of other materials. The interposer may be constructed with traces on one side, both sides, or in a layered manner with multiple conductive layers depending upon the needs of the optical switch.

The fiber termination 126 is mounted to the interposer by fiber array mount 128. It should be appreciated that the fiber array mount 128 must both hold the fiber termination 126 and align the fiber array relative to the mirror array 124. A wide variety of mount structures may be used and the actual construction of a particular mount 128 will depend in large part on the nature of the fiber termination being held. In the embodiment shown, a collimator is formed as part of the fiber termination by aligning a lens array (not separately shown) at the face of the optical fibers. In other embodiments, the lens array may not be necessary and/or additional components (such as an optical multiplexer/demultiplexer, optical detectors, etc.) may be made part of the fiber termination 126. In any of these embodiments, an appropriate mount 128 can be made to secure the fiber array to the interposer 122.

Figure 4:
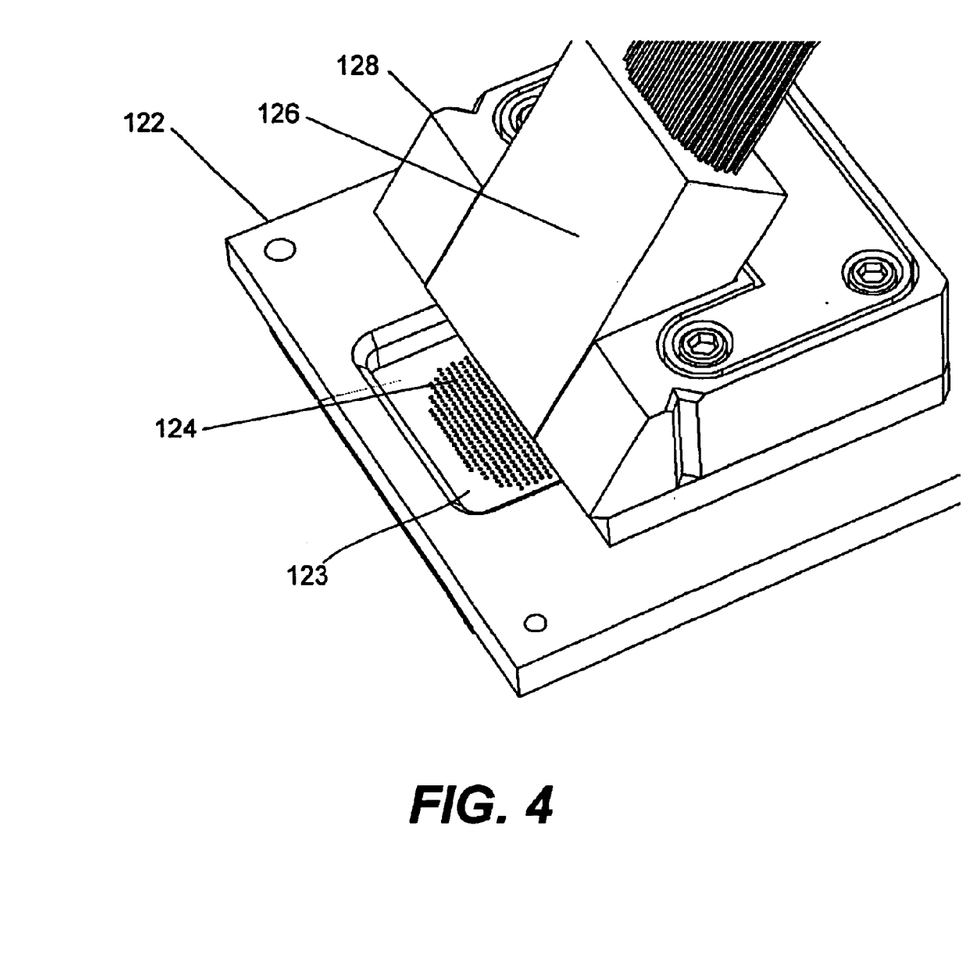
FIG. 4 is a diagrammatic perspective illustration of the fiber array mount portion of the optical switch component of FIG. 2.
Figure 5:
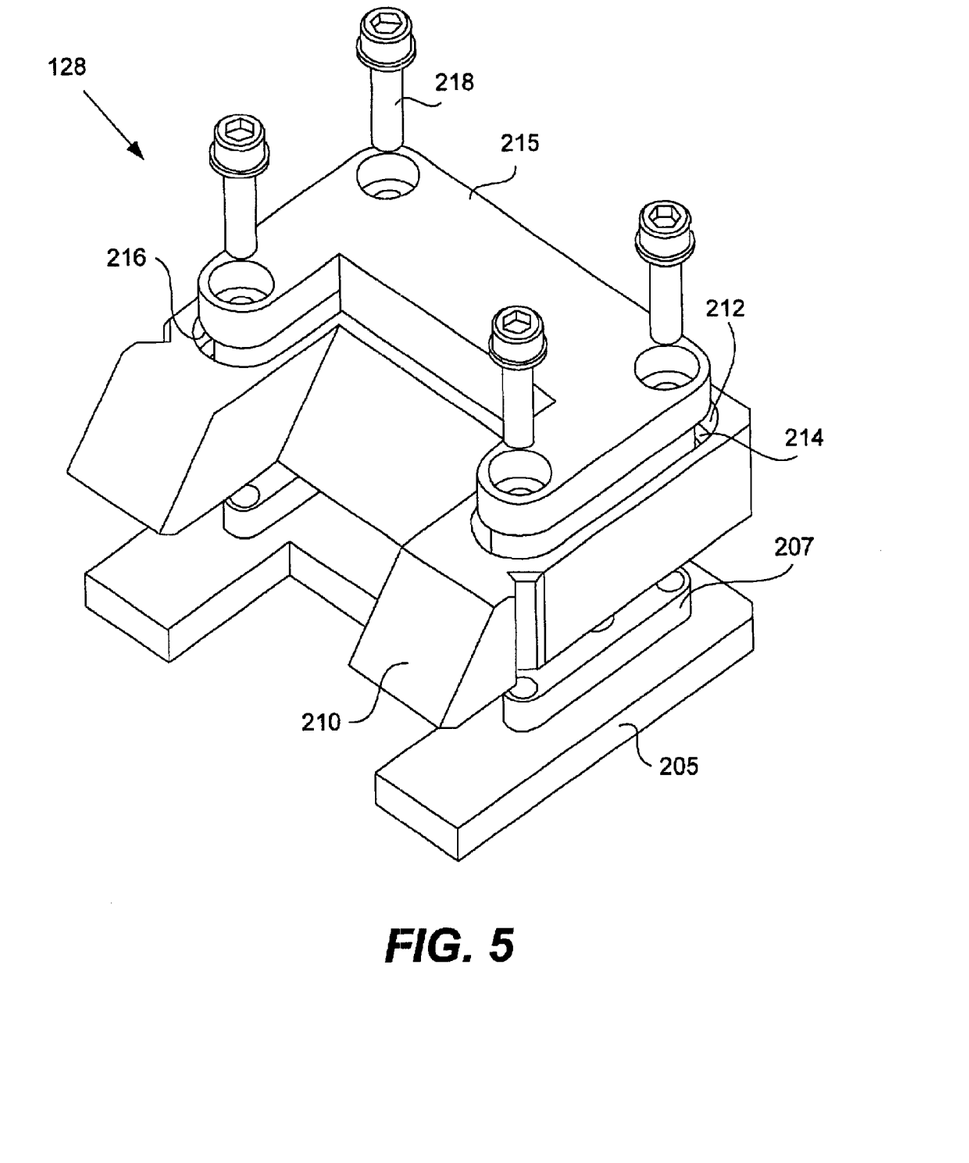
FIG. 5 is an exploded perspective view of the fiber array mount of FIG. 4.

Referring next to FIGS. 4 and 5, a particular mount 128 will be described. As best seen in FIG. 5, the mount includes a base 205, an adjustable alignment stage 210 and a bracket 215. The base 205 is substantially U-shaped and includes an alignment ridge 207. The stage 210 is also substantially U-shaped and includes a substantially U-shaped slot 212, which has a ledge 214 therein. The slot 212 is arranged to fit over the alignment ridge 207. The bracket 215 is also sized and shaped to fit into the slot 212 in alignment stage 210 and its lower end is stepped down to form a ledge 216 arranged to rest on the ledge 214. The bracket 215 has a recess in the bottom surface thereof (not shown) that is arranged to nest over alignment ridge 207 on base 205 to position the stage 210. Fasteners 218 (which may be screws, bolts or a variety of other suitable fastening or locking means) are then used to secure the bracket 215 to the base 205. The fiber array termination 126 is held in the stage 210. Appropriate features (not shown) may be added to either the termination 126 or the stage 210 to help the stage hold the termination in place. In some embodiments, an adhesive such as epoxy may be used to secure the stage to the termination.

It should be appreciated that in the described fiber array mount 128, the position of the stage may be adjusted within the tolerances between the relative widths of the slot 212 and alignment ridge 207. This permits the fiber array to be relatively precisely aligned relative to the mirror array 124 during installation of the fiber array. Guide grooves 220 may be provided to provide a precision gripping point for handling equipment and may be used in combination with interposer alignment hole 136 to facilitate precise alignment of the fiber array relative to the mirror array 124. When the proper alignment has been made, stage 210 is locked in place by tightening the fasteners (e.g. screws) 218. It should also be appreciated that with the described independent alignment stage arrangement, the bracket 215 substantially only presses down against the ledge 214 in stage 210. Thus only vertical forces are transmitted from the bracket 215 to the stage 210 to lock the stage in place. The nesting of the recess in bracket 215 over ridge 207 absorbs any torsional component without passing any of that force to the stage 210. Notably, when screws are used as the fasteners, rotational forces are not transmitted from the fasteners 218 to the alignment stage 210 during tightening, which could have the effect of throwing off the alignment of the fiber array.

As best seen in FIG. 4, the mount 128 holds the fiber array termination 126 over the mirror array 124, in a manner that covers only a portion (e.g. half) of the mirror array to leave an optical path for reflected light to pass through. It should be appreciated that the U-shaped nature of the various illustrated mount structures provide a good connection with the interposer without interfering with the optical path. However, a variety of other mount structure geometries and configurations may be used as well.

In the illustrated embodiments, the only electrical components carried by the interposers are the dice, the connectors and the conductive features that electrically couple the connectors to the dice. However, it should be appreciated that a wide variety of other electrical components can be incorporated onto the interposer. By way of example, this may include other integrated circuits (such as various ASICs or programmable logic devices) as well as various discrete components (e.g., resistors, capacitors, inductors etc.) mounted on, formed on or formed within the interposer.

Figure 6:
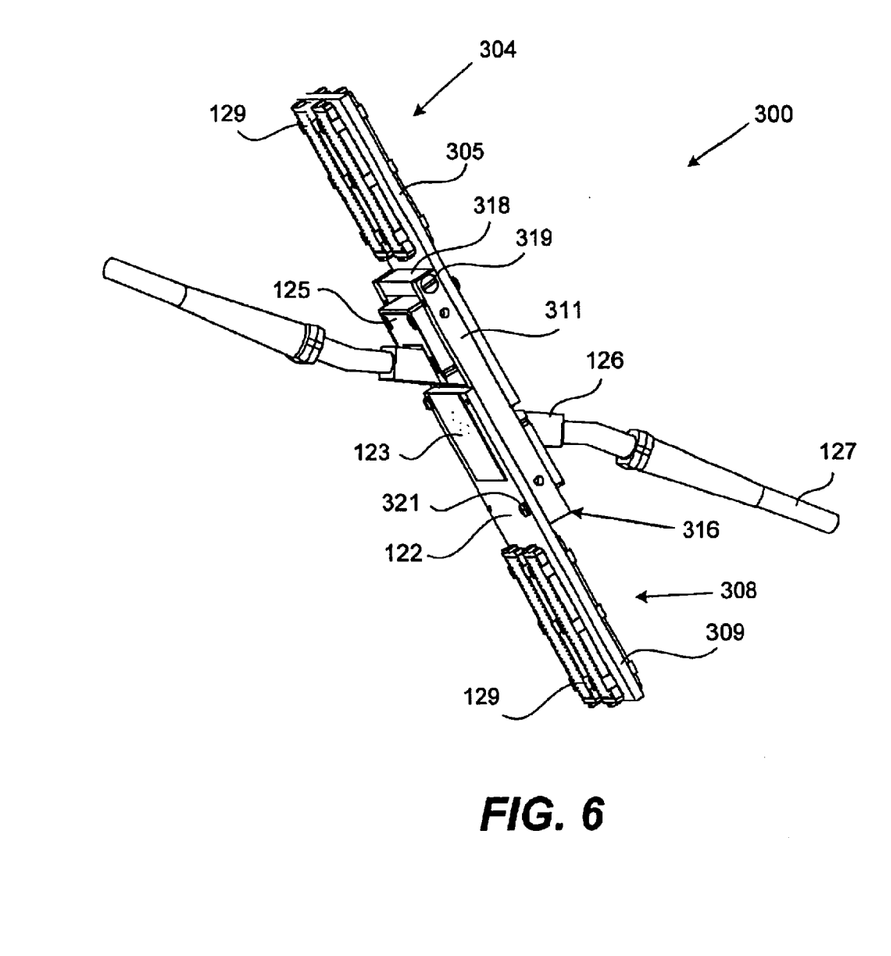
FIG. 6 is a diagrammatic perspective illustration of an optical switch incorporating a pair of the optical switch components illustrated in FIG. 2.

Referring next to FIG. 6, the assembly of an optical switch 300 using a pair of identical optical switch components 120 in accordance with one embodiment of the invention will be described. The optical functioning of the switch 300 requires that the relative position of the input mirror array and the output mirror array be fixed. In the illustrated embodiment, this is accomplished by mounting an input optical switch component 304 and an output optical switch component 308 to an alignment frame 311 which provides the required spacing between the interposers. That is, the alignment frame 311 cooperates with the interposers to provide the physical structure holding the mirror arrays in a fixed relationship relative to one another thereby maintaining the required linear spacing (in a direction parallel to the mirror planes) and normal spacing (in a direction perpendicular to the mirror planes) between the mirror arrays. It will be appreciated that the required linear and normal spacing are determined by the design characteristics of the switch optics.

The nature of the alignment frame 311 may be widely varied. In the embodiment shown, it takes the form of a rectangular open frame. As best seen in FIG. 6, the frame 311 rests directly on the input and output interposers 305, 309. The frame is positioned such that it circumscribes the pairs of mounts 128, dice 123 and fiber array terminators 126, while leaving the connectors 129 outside of the frame 311 to facilitate external electrical connections. The frame 311 may be formed in any suitable manner. In the embodiment shown, the frame is composed of two pieces. The first piece is a U-shaped element 316 and the second piece is a cross bar element 318 that is secured to the U-shaped element 316 using an appropriate fastening arrangement such as screws 319. An alignment pin 321 carried by the frame 311 may cooperate with alignment holes in the interposer to facilitate alignment of the frame relative to the interposers and to hold the frame in position.

One noteworthy feature of the described optical switch 300 is that the switch is composed of two identical optical component halves. It should be appreciated that forming a switch from identical switch halves may have some significant production cost advantages over switches that are formed from different components due to standardization. On the other hand, the use of identical switch halves is not required by any means and the described interposer and alignment frame based packaging structure works well regardless of whether the optical switch components are identical. By way of example, it may be desirable to provide the optical connectors with all of the fiber connections on one side. One way that this can be accomplished is to utilize a folded switch geometry as discussed above with respect to FIG. 1(b). In this arrangement, the fixed mirror 145 may be carried by a rigid substrate 148 having a geometry similar to an interposer, while the moveable mirror array is carried by the interposer. It should be appreciated that the fiber arrays would only need to be attached to substrate in this arrangement, while the interposer connectors 129 (which have large number of connections) may only be required on the interposer. This arrangement has the benefit of requiring fewer components than the previously described embodiment. However, the described packaging arrangement can readily be used to protect either arrangement, or with a variety of other optical switch configurations. FIG. 11 illustrates a suitable substrate that carries a fixed mirror.

The optical switch 300 has all of the components necessary to form a fully functioning switch. However, since the MEMS mirror arrays in particular are somewhat delicate, it is generally desirable (and necessary) to provide environmental protection for the switch to create a commercially viable product. The environmental protection preferably isolates the switch from dirt, moisture and other contaminants. It also protects the switch from mechanical shock and vibration, electrostatic shock, RF interference and temperature extremes.

Figure 7:
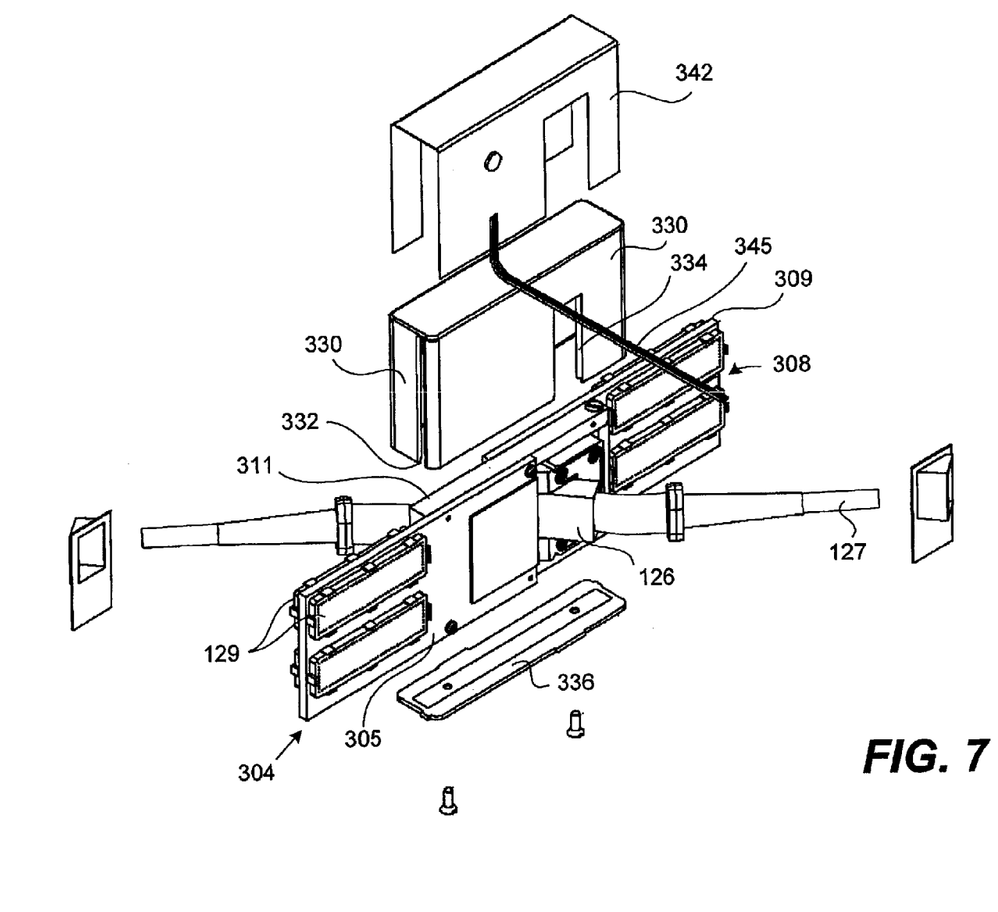
FIG. 7 is an exploded diagrammatic perspective view illustrating an inner housing arrangement in accordance with one embodiment of the present invention that is suitable for protecting the optical switch of FIG. 6.

Referring next to FIG. 7, a housing arrangement suitable for protecting the heart of the switch 300 will be described. In the embodiment shown, an inner housing 330 is arranged to slide over the interposers 305, 309 between the alignment frame 311 and the electrical connectors 129. Thus, the housing has interposer slots 332 arranged to fit over the interposers as well as terminator slots 334 arranged to fit over fiber array terminations 126. A base 336 forms a cap for the housing. In the embodiment shown, the base 336 is secured to the frame 311 by screws, although this is not required. Flashings 339 are then slipped over the fiber bundles 127 and fiber array terminations 126 to enclose the terminator slots 334.

In some (and possibly most) applications, it will be desirable to seal (and potentially hermetically seal) the inner chamber of the switch. This can readily be done by joining the base 336 to the inner housing 330, joining the housing 330 to the interposers 305, 309 and joining the flashings 339 to the housing 330. In the described embodiment, the various components are joined by soldering. However, such joining can be accomplished by a wide variety of conventional techniques including soldering, welding, adhesive bonding and the like. In some embodiments, metallic seal lines (not shown) may be formed on the interposer surface to serve as a solder base for soldering the housing to the interposers. When assembled with an inner housing, the optical switch 300 has the appearance illustrated in FIG. 8.

It is not uncommon for optical switches to be placed in environments where it can get relatively cold. Accordingly, a resistive heating blanket 342 may be placed over the inner housing to facilitate heating when necessary or desired. If a heater is desired, a heater cord 345 is provided to power the heating blanket 342. The heater also allows the package to be held at a constant temperature for improved optical performance. In alternative embodiments it may be desirable to provide a cooler and/or a bi-directional heat pump either in addition to, or in place of the heater.

Figure 8:
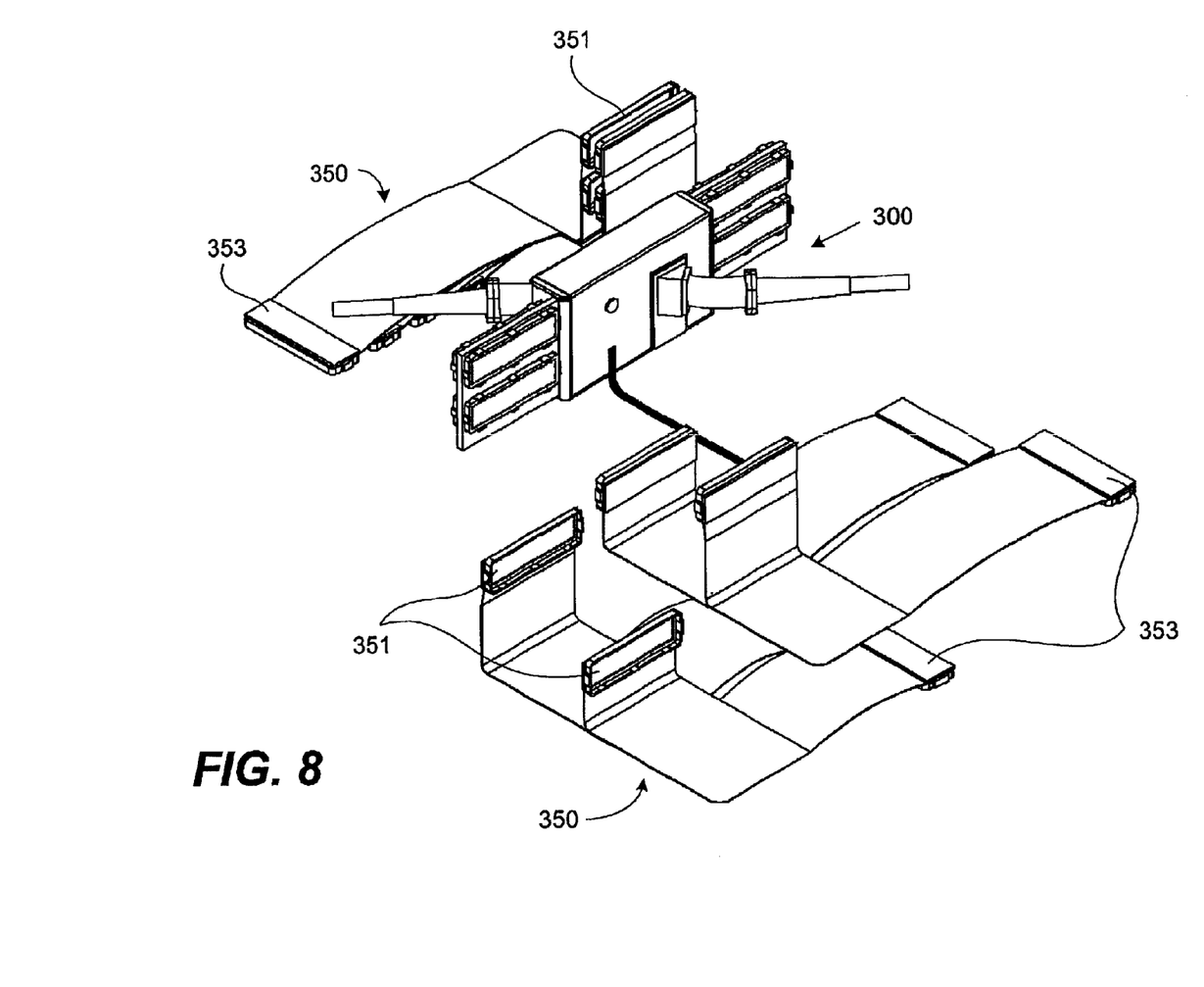
FIG. 8 is an exploded diagrammatic perspective view illustrating the attachment of ribbon cables to the optical switch of FIG. 6.

Referring next to FIG. 8, ribbon cables 350 having internal connectors 351 and external connectors 353 may be provided to electrically couple the switch to external drivers. The internal connectors 351 plug into the interposer connectors 129 and the external cable connectors 353 plug into connectors external to the package. Of course, when desired, connectorless joining methods may be used to couple the ribbon cable to the interposer. In the illustrated embodiment, each interposer has four connectors 129 and a separate ribbon cable 350 is provided for each connector. Thus the optical switch has a total of eight ribbon connectors. Of course the actual number of control lines and thus, the number and size of the various connectors that are required will vary significantly based on the needs of a particular switch. In current electrostatic MEMS mirrors that are rotatable in two degrees of freedom, four control lines are required for each mirror. In switches having 256 input ports, that requires over 2000 different control lines for the input and output mirrors alone (four lines per mirror, 256 input mirrors, 256 output mirrors). Additionally, relatively high voltages are currently required to rotate electrostatic mirrors (e.g. voltages on the order of 100 volts in available systems). Thus, high voltage drivers are required. In some embodiments, the high voltage drivers can be mounted on the interposers themselves. However, due to space limitations, it may be impractical to place the high voltage drivers on the interposers. Thus, the drivers can be located on external circuit boards. One effect of this approach is that the spacing between conductors must be a bit larger than would be required in lower voltage applications which tends to increase the size of the required connectors. Of course, these technologies are rapidly advancing and as the technology develops, it is likely (indeed expected) that lower drive voltages and higher connector densities will become common.

Although four control lines per mirror may be required in some MEMS based mirror arrays, it should be appreciated that fewer or more control lines may require for other mirror arrays. For example, MEMS based mirror arrays that have rotation though a single degree of freedom, may require just two control lines per mirror and further work in the area may be able to reduce the required number of control lines even further.

Figure 9:
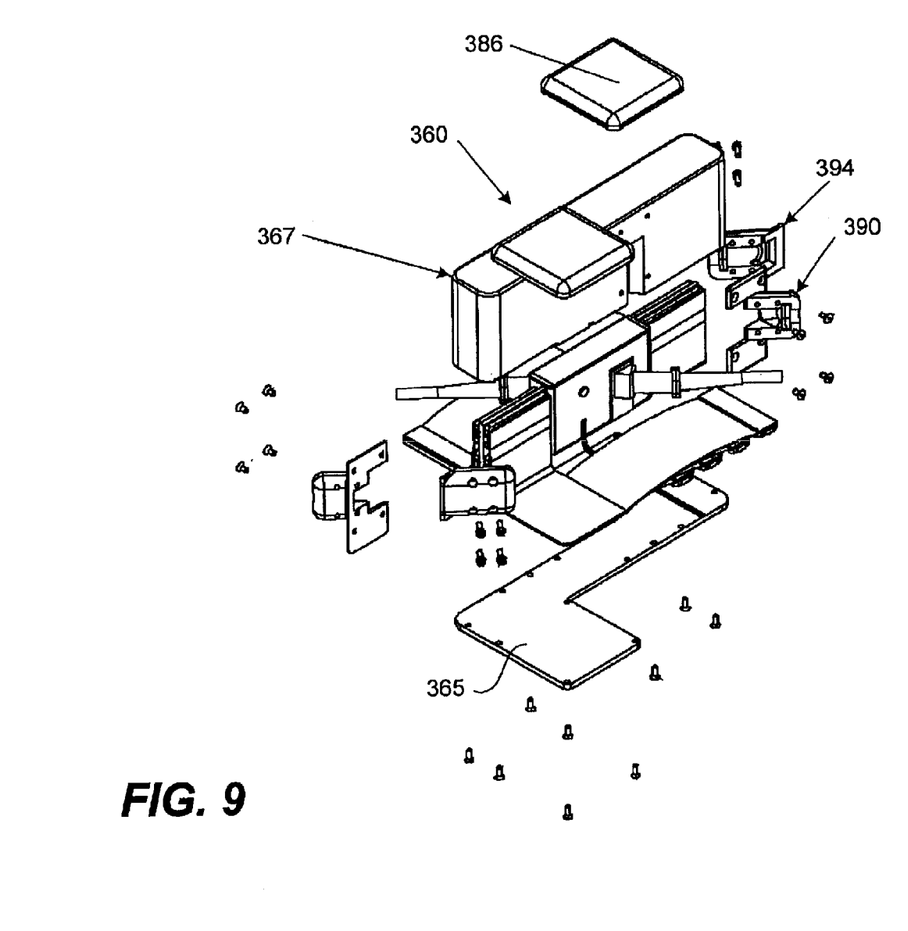
FIG. 9 is an exploded diagrammatic perspective view illustrating an outer housing arrangement in accordance with one embodiment of the present invention.
Figure 10:
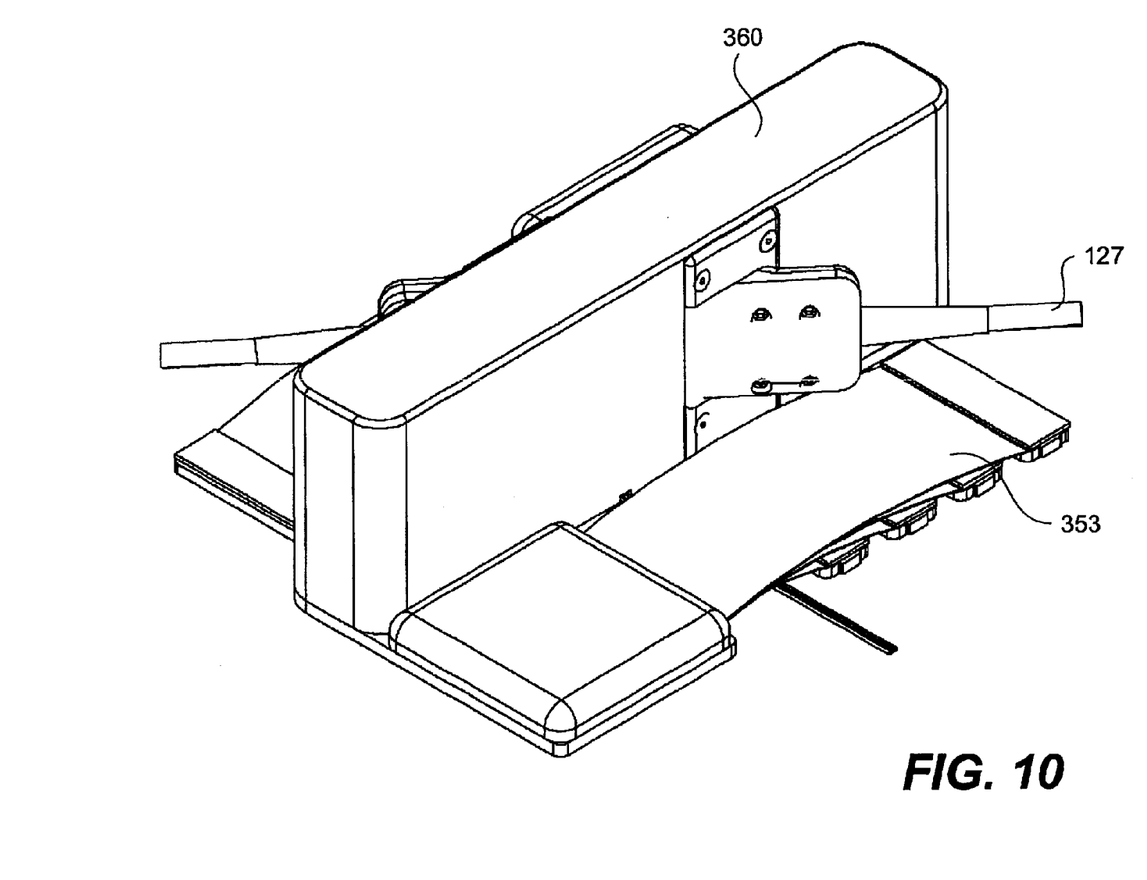
FIG. 10 is a diagrammatic perspective view illustrating the exterior appearance of the optical switch package of FIG. 9.

Once the ribbon cables have been attached an external housing assembly 360, can be placed over the entire switch assembly to further environmentally protect the switch. Of course, the actual design of the outer housing may be widely varied. By way of example, one suitable embodiment is illustrated in FIG. 9. In the embodiment shown, the outer housing assembly 360 includes an outer housing shell 362, an outer housing base 365, flexible cable strain relief clamps 386, fiber bundle strain relief clamps 390, and clamp covers 394. The various components can be coupled together using appropriate fasteners such as screws (not shown).

In the embodiment shown, the fiber bundle strain relief clamps 390 are coupled to the housing shell 362 using screws or other suitable fasteners. The clamp covers 394 are then coupled to the strain relief clamps 390 (again using suitable fasteners such as screws). Similarly, the flexible cable strain relief clamps 386 may be attached to the base 365 by screws or other appropriate fasteners.

Foam padding (not shown) or another highly damping resilient filler material is placed within the outer housing assembly 360 so that the only mechanical support suspending the inner housing assembly within the outer housing assembly is the resilient foam padding. In the described embodiment, a loose piece of foam is placed within the housing. However, in alternative embodiments a resilient material may be adhered to or molded into the outer housing shell 362. The foam padding allows substantially independent movement of the inner housing assembly within the outer housing assembly thereby isolating the switch from vibrations and/or shock impulses that may disturb the outer housing. A thermal path can be provided between the inner and outer housings by using a thermally conductive (yet resilient) filler material.

Although only a few embodiments of the present invention have been described, it should be understood that the present invention may be embodied in many other specific forms without departing from the spirit or scope of the invention. For example, although the illustrated embodiment has been described primarily in the context of a device having optical inputs and outputs carried by different interposers (e.g., using a simple 2 mirror array optical switch approach), it should be appreciated that the majority of the described packaging techniques can be readily applied to folded optical path based optical switches as well. These might include optical switches wherein both the input and output fiber bundles are carried by the same interposer and the second interposer carries all of the moveable mirrors and their associated electronics and/or other components. It may also apply to mirror array based optical switches having other optical paths and to optical switches having a single, or more than two fiber bundles.

The described packaging techniques can be used with optical switches of any appropriate size. Current efforts are primarily focusing on building 64, 256 and 1000 channel optical switches, however the described packaging can readily be applied to substantially larger and smaller switches as well. The invention has been described primarily in the context of semiconductor based MIMS mirror array structures. However, it should be apparent that most of the described techniques can apply equally well to switches using other mirror array technologies. Also, a number of unique packaging features have been described that combined to provide a particular optical switch packaging arrangement. However, it should also be appreciated that many of the described features are independent and do not need to be used in combination. Therefore, it should be apparent that the present examples are to be considered as illustrative and not restrictive, and the invention is not to be limited to the details given herein, but may be modified within the scope of the appended claims.

What is claimed is:

1. An optical switch component comprising:
an interposer having an opening therein and a multiplicity of contact pads disposed about the opening and a multplicity of traces that are electrically connected to respective contact pads; and
a die having an array of mirrors, the die being electrically connected to the contact pads and mounted on the interposer such that the array of mirrors is exposed through the interposer opening, whereby the optical switch component is arranged such that light switched by the array of mirrors passes through the interposer opening.

2. An optical switch component as recited in claim 1 further comprising at least one electrical connector mounted on the interposer, each interposer connector being electrically connected to associated contact pads through associated traces.

3. An optical switch component as recited in claim 1 further comprising a fiber array mount arranged to receive an optical fiber termination and to position the optical fiber termination appropriately over the array of mirrors.

4. An optical switch component as recited in claim 3 further comprising an optical fiber termination that terminates plurality of optical fibers, the optical fiber termination being secured to the interposer by the fiber array mount.

5. An optical switch component is recited in claim 1 further comprising additional electrical circuitry carried by or integrated onto the interposer, wherein the additional electrical circuitry includes at least one of an integrated circuit and a discrete component.

6. An optical switch component is recited in claim 1 wherein the die is attached to the interposer by directly metallurgically joining bond pads on the die to associated contact pads on the interposer.

7. An optical switch component comprising:
an interposer having an opening therein and a multiplicity of contact pads disposed about the opening and a multiplicity of traces that are electrically connected to respective contact pads;
a die having an array of mirrors, the die being electrically connected to the contact pads and mounted on the interposer such that the array of mirrors is exposed through the interposer opening; and
a fiber array mount arranged to receive an optical fiber termination and to position the optical fiber termination appropriately over the array of mirrors, wherein the fiber array mount includes:
a base having an alignment ridge;
an alignment stage having a slot therein that fits over the alignment ridge, the stage including a stage ledge within the slot;
a bracket that fits into the slot, the bracket including a bottom surface recess arranged to nest over the alignment ridge within the slot, and a bracket ledge arranged to rest on the stage ledge within the slot; and
fasteners arranged to couple the bracket to the base to hold the alignment stage and base together.

8. An optical switch comprising:
a pair of optical switch components;
an alignment frame;
wherein each optical switch component includes,
an interposer having an opening therein and a multiplicity of contact pads disposed about the opening and a multiplicity of traces that are electrically connected to respective contact pads,
a die having an array of mirrors, the die being electrically connected to the contact pads and mounted on the interposer such that the array of mirrors is exposed through the interposer opening,
a fiber array mount arranged to receive an optical fiber termination and to position the optical fiber termination appropriately over the array of mirrors, and
an optical fiber termination that terminates a plurality of optical fibers, the optical fiber termination being secured to the interposer by the fiber array mount, and
wherein the alignment frame is arranged between the interposer of the respective optical switch components to help maintain a desired spacing between the respective arrays of mirrors.

9. An optical switch component comprising:
a rigid, planar interposer having a multiplicity of contact pads and a multiplicity of traces that are electrically connected to respective contact pads;
a die having an array of mirrors, the die being electrically connected to the contact pads and mounted on the interposer to expose the array of mirrors; and
a fiber array mount attached to the interposer, the fiber array mount being arranged to receive a plurality of optical fibers and to position the optical fibers appropriately over the array of mirrors.

10. An optical switch comprising:
a pair of optical switch components as recited in claim 9;
an alignment frame arranged between the interposers of the respective optical switch components to help maintain a desired spacing between the respective arrays of mirrors; and
a pair of optical fiber terminations that each terminate an associated plurality of optical fibers, each optical fiber termination being secured to an associated one of the interposers by an associated one of the fiber array mounts.

11. An optical switch as recited in claim 10 wherein the alignment frame is arranged to rest directly on the interposers and to surround the dice and fiber array mounts.

12. An optical switch as recited in claim 10 further comprising an inner housing that enclosed the dice, the fiber array mounts the alignment frame and portions of the interposers, but leaves a portion of the interposers exposed to facilitate electrically connecting the dice to external devices.

13. An optical switch as recited in claim 12 wherein the inner housing is sealed.

14. An optical switch as recited in claim 13 wherein a seal is formed between the inner housing and the respective interposers by soldering the inner housing to the interposers.

15. An optical switch as in claim 12 further comprising a heater arranged to heat the inner housing.

16. An optical switch as recited in claim 12 further comprising a cooler arranged to cool the inner housing.

17. An optical switch component as recited in claim 12 further comprising at least one electrical interposer connectors, each interposer connectors being mounted on an associated interposer outside of the inner housing and being electrically connected to an associated die through associated contact pads and traces.

18. An optical switch as recited in claim 17 further comprising at least one ribbon cable, each ribbon cable being coupled to an associated interposer connector and having an external connector for electrically connecting to external systems.

19. An optical switch component as recited in claim 9 further comprising at least one electrical connector mounted on the interposer each interposer connector being electrically connected to associated contact pads through associated traces.

20. An optical switch component as recited in claim 19 further comprising electrical circuitry carried by or integrated onto the interposer.

21. An optical switch component as recited in claim 20 wherein the electrical circuitry includes a second die having integrated circuits formed therein, the second die being mounted on the interposer.

22. An optical switch component as recited in claim 9 wherein the die is attached to the interposer by directly metallurgically joining bond pads on the die to associated contact pads on the interposer.

23. An optical switch component as recited claim 9 further comprising an optical fiber termination a plurality of optical fibers, the optical fiber termination being secured to the interposer by the fiber array mount.

24. An optical switch component as recited in claim 23 wherein the optical fiber termination collimated the signals carried by the optical fibers.

25. An optical switch as recited in claim 9 wherein the interposer is formed from a material selected from a group consisting of a ceramic material, silicon and a composite laminate.

26. An optical switch component comprising:
an interposer having a multiplicity of contact pads and a multiplicity of traces that are electrically connected to respective contact pads;
a die having an array of mirrors, the die being electrically connected to the contact pads and mounted on the interposer to expose the array of mirrors; and
a fiber array mount arranged to receive a plurality of optical fibers and to position the optical fibers appropriately over the array of mirrors wherein the fiber array mount includes:
a base having an alignment ridge;
an alignment stage having a slot therein that fits over the alignment ridge, the stage including a stage ledge within the slot;
a bracket that fits into the slot, the bracket including a bottom surface recess arranged to nest over the alignment ridge within the slot, and a bracket ledge arranged to rest on the stage ledge within the slot; and
fasteners arranged to couple the bracket to the base to hold the alignment stage and base together.

27. An optical switch comprising:
a pair of optical switch components each having an interposer having a multiplicity of contact pads and a multiplicity of traces that are electrically connected to respective contact pads, a die having an array of mirrors, the die being electrically connected to the contact pads and mounted on the interposer to expose the array of mirrors, and a fiber array mount attached to the interposer, the fiber arrange mount being arranged to receive a plurality of optical fibers and to position the optical fibers appropriately over the array of mirrors;
an alignment frame arranged between the interposers of the respective optical switch components to help maintain a desired spacing between the respective arrays of mirrors; and a pair of optical fiber terminations that each terminate an associated plurality of optical fibers, each optical fiber termination being secured to an associated one of the interposers by an associated one of the fiber array mounts;
an inner housing that covers the dice; and
an outer housing that encases the optical switch components and the inner housing.

28. An optical switch as recited in claim 27 wherein a resilient filler material is positioned between the inner and outer housings.

29. An optical switch comprising:
first and second interposers;
a die having an array of mirrors, the die being mounted on the first interposer;
an alignment frame sandwiched between the interposers to help maintain a desired spacing between the interposers; and
input and output optical fiber bundles for respectively delivering optical signals to and transmitting optical sings from the optical switch.

30. An optical switch as recited in claim 29 further comprising a second die having a second array of mirrors.

31. An optical switch as recited in claim 30 wherein:
the second die is mounted on the second interposer;
the input fiber bundle is mounted on the first interposer and the output fiber bundle is mounted on the second interposer; and
the alignment frame helps maintain a desired spacing between the respective arrays of mirrors.

32. An optical switch as recited in claim 29 wherein the alignment frame is arranged to rest directly on the interposers and to surround the die and termination portions of the optical fiber bundles, the optical switch further comprising an inner housing that enclosed the die, the alignment frame and portions of the first and second interposers, but leaves a portion of the first interposer exposed to facilitate electrical connection to external devices.

33. An optical switch as recited in claim 29 further comprising at least one electrical connector mounted on the first interposer and electrically connected to the die.

34. An optical switch component as recited in claim 29 wherein the fiber bundles are collimated arrays of optical fibers.

35. An optical switch comprising:
first and second interposers;
first and second dice each having an array of mirrors, each die being mounted on and electrically connected to an associated one of the interposers;
an alignment frame arranged between the interposers to help maintain a desired spacing between the respective arrays of mirrors; and
input and output fiber arrays for respectively delivering optical signals to and transmitting optical signals from the optical switch.

36. An optical switch as recited in claim 35 further comprising a plurality of electrical connectors each electrical connector being mounted on an associated interposer and electrically connected to an associated die through at least traces on the associated interposer.

37. An optical switch as recited in claim 36 wherein the alignment frame is arranged to rest directly on the interposers and to surround the dice and fiber arrays, the optical switch comprising an inner housing that encloses the dice, the alignment frame and portions of the interposers, but leaves the connectors exposed to facilitate electrical connection to external devices.

38. An optical switch as recited in claim 35 further comprising:
an inner housing that covers the dice.

39. An optical switch as recited in claim 38 wherein the inner housing is sealed.

40. An optical switch as recited in claim 39 wherein a seal is formed between the inner housing and the respective interposers by soldering the inner housing to the interposers.

41. An optical switch as recited in claim 38 further comprising a heater arranged to heat the inner housing.

42. An optical switch as recited in claim 38 further comprising:
a plurality of electrical interposer connectors each interposer connector being mounted on an associated interposer outside of the inner housing; and
a plurality of ribbon cables, each ribbon cable being coupled to an associated interposer connector and having an external connector for connecting to external systems.

43. An optical switch comprising:
first and second interposers;
first and second dice each having an array of mirrors, each die being mounted on and electrically connected to an associated one of the interposers;
input and output fiber bundles, for respectively delivering optical signals to and transmitting optical signals from the optical switch;
an inner housing that covers the dice; and
an outer housing that encases the interposers, the dice, termination portions of the fiber bundles and the inner housing.

44. An optical switch as recited in claim 43 further comprising a resilient filler material positioned between the inner and outer housings.

45. An optical switch comprising:
first and second interposers;
an array of mirrors mounted on the first interposer;
input and output bundles fiber respectively delivering optical signals to and transmitting optical signals from th optical switch;
an inner housing that encloses the array of mirrors, termination on portions of the fiber bundles and first portions of the interposers, but leaves a second portion of at least the first interposer exposed to facilitate electrical connection to external devices; and
an outer housing that encases the inner housing and the entire interposers while permitting the fiber bundles to pass therethrough.

46. An optical switch as recited in claim 45 further comprising a resilient filler material positioned between the inner and outer housings.

47. An optical switch comprising:
first and second interposers each having a multiplicity of contact pads and a multiplicity of traces that are electrically connected to respective contact pads;
first and second die each having an array of mirrors, each die being mounted on and electrically connected to the contact pads of an associated one of the interposers and mounted on the interposer;
a plurality of electrical interposer connectors each interposer connector being mounted on an associated interposer and electrically connected to the contact pads of the associated interposer through traces of the associated interposer;
input and output fiber arrays, for respectively delivering optical signals to and transmitting optical signals form the optical switch;
an inner housing that encloses the dice, termination portions of the fiber arrays and portions of the interposers, but leaves the electrical interposer connectors exposed;
a plurality of ribbon cables, each ribbon cable being coupled to an associated interposer connector and having an external connector for connecting to external systems;
an outer housing that encases the inner housing and the entire interposers including the interposer connectors, the outer housing being arranged to permit the ribbon cables and fiber bundles that terminate in the input and output fiber arrays to pass therethrough; and
a resilient filler material positioned between the inner and outer housings.

48. An optical switch comprising:
an interposer having an opening therein and a multiplicity of contact pads disposed about the opening and a multiplicity of traces that are electrically connected to respective contact pads;
a die having an array of mirrors, the die being electrically connected to the contact pads and mounted on the interposer such that the array of mirrors is exposed through the interposer opening;
a substrate;
an alignment frame arranged between the interposer and the substrate to help maintain a desired spacing between the interposer and the substrates; and
at least one optical fiber bundle for delivering optical signals to and transmitting optical signals from the optical switch.

49. An optical switch as recited in claim 48 further comprising a fixed mirror mounted on the substrate and wherein;
the optical fiber bundle is mounted on the substrate; and
the alignment frame helps maintain a desired spacing between a fixed mirror carried by the substrate and the arrays of mirrors.

* * * * *

UNITED STATES PATENT AND TRADEMARK OFFICE
CERTIFICATE OF CORRECTION

PATENT NO.   : 6,819,824 B1
DATED        : November 16, 2004
INVENTOR(S)  : Welsh et al.

Figure 11A:
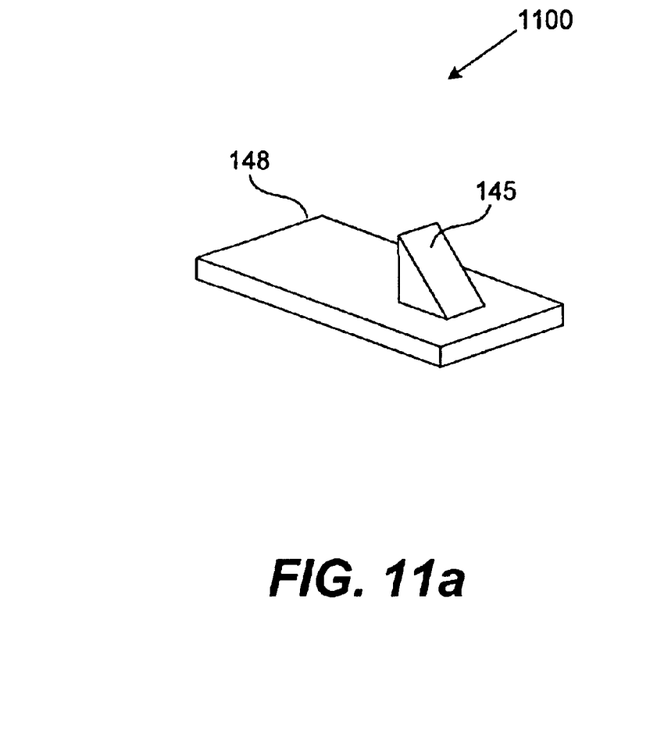
Figure 11B:
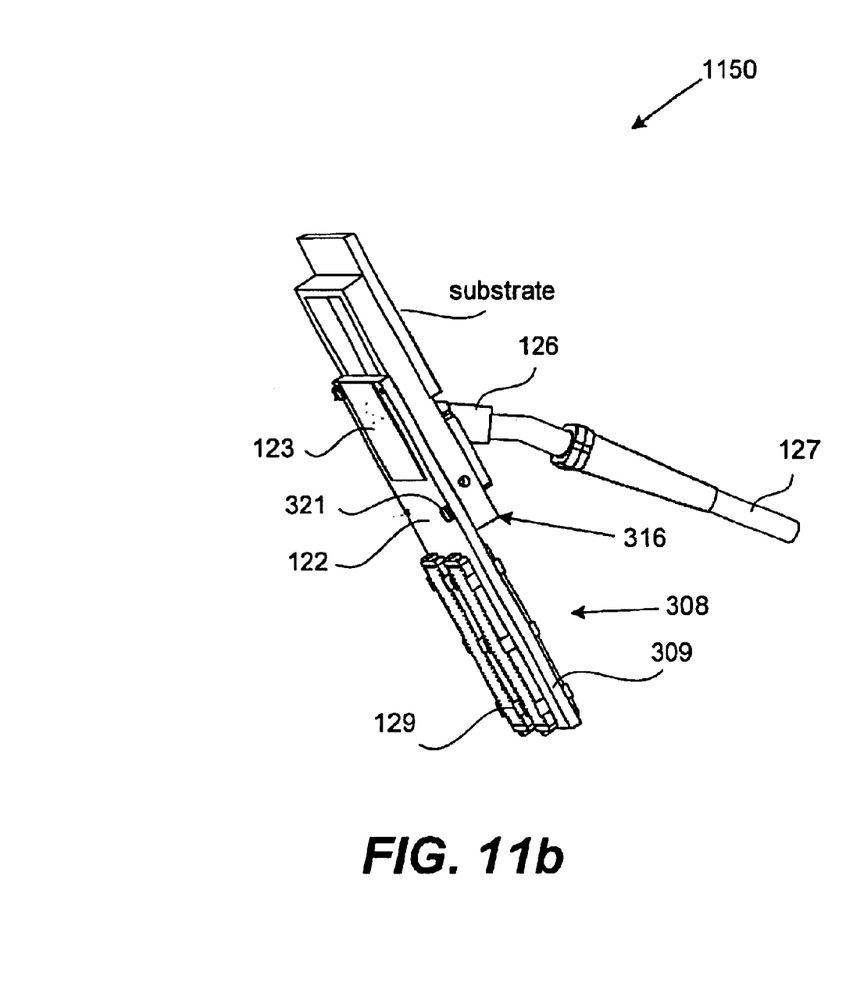

It is certified that error appears in the above-identified patent and that said Letters Patent is hereby corrected as shown below:

Column 3,
Line 63, add -- Figure 11b is a diagrammatic perspective view of a switch incorporating a substrate of Figure 11(a) -- after brief description of FIGURE 11(a).

Column 6,
Line 61, change "to substrate" to -- to the substrate --.

Column 9,
Line 17, change "MIMS" to -- MEMS --.
Line 20, change "technologies" to -- or non-array technologies such as holographics, liquid crystals, etc. --.
Line 42, add -- before and after being reflected by the array of mirrors -- after "opening".
Lines 56 and 61, change "is recited" to -- as recited --.

Column 10,
Line 46, change "having a" to -- having an opening therein and a --.
Line 52, add -- the array of mirrors through the interposer opening, whereby the optical switch components arranged such that light switched by the array of mirrors passes through the interposer opening before and after being reflected by -- after "expose".

Column 11,
Line 5, change "enclosed the dice" to -- encloses the dice --.
Line 15, change "as in" to -- as recited in --.
Line 46, change "recited claim" to -- recited in claim --.
Line 47, change "termination a" to -- termination that terminates a --.
Line 51, change "collimated" to -- collimates --.
Line 53, change "switch as" to -- switch component as --.
Line 47, change "sings" to -- signals --.

Column 12,
Line 61, change "enclosed the die" to -- encloses the die --.

Column 13,
Line 65, change "bundles fiber" to -- fiber bundles for --.
Line 67, change "th optical" to -- the optical --.

UNITED STATES PATENT AND TRADEMARK OFFICE
CERTIFICATE OF CORRECTION

PATENT NO. : 6,819,824 B1
DATED : November 16, 2004
INVENTOR(S) : Welsh et al.

It is certified that error appears in the above-identified patent and that said Letters Patent is hereby corrected as shown below:

<u>Column 14,</u>
Line 2, change "termination on portions" to -- termination portions --.
Line 16, change "second die" to -- second dice --.
Line 26, change "signals form" to -- signals from --.
Line 55, change "the substrates" to -- the substrate --.

Signed and Sealed this

Nineteenth Day of April, 2005

JON W. DUDAS
*Director of the United States Patent and Trademark Office*